Nov. 24, 1925.
C. E. RECORDON ET AL
LIQUEFACTION OF GASES
Filed June 24, 1922
1,562,915
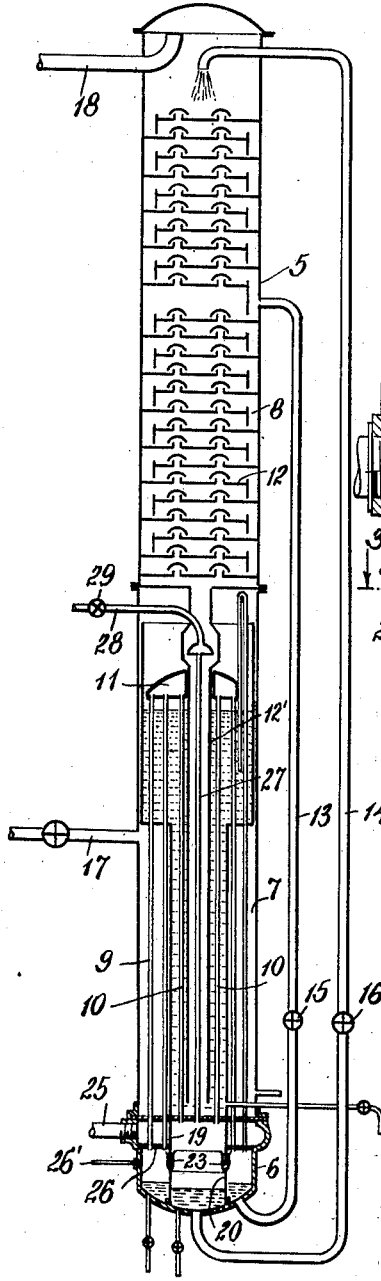
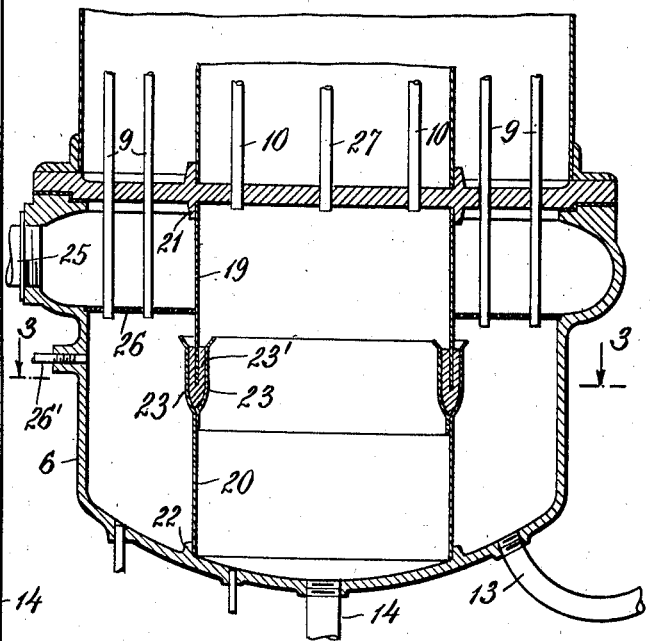
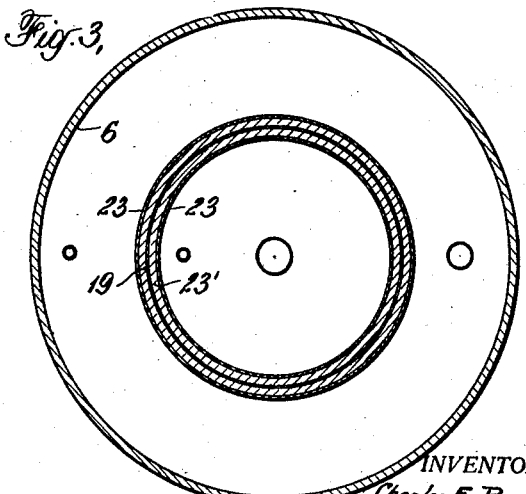
INVENTORS
Charles E. Recordon
and John W. Hille
BY
Pennie Davis Marvin & Edmonds
their ATTORNEYS Patented Nov. 24, 1925.

1,562,915

UNITED STATES PATENT OFFICE.

CHARLES E. RECORDON, OF ELIZABETH, NEW JERSEY, AND JOHN W. HILLE, OF BROOKLYN, NEW YORK, ASSIGNORS TO AIR REDUCTION COMPANY, INCORPORATED, A CORPORATION OF NEW YORK.

LIQUEFACTION OF GASES.

Application filed June 24, 1922. Serial No. 570,696.

*To all whom it may concern:*

Be it known that we, CHARLES E. RECORDON, a citizen of the United States, residing at Elizabeth, in the county of Union, State of New Jersey, and JOHN W. HILLE, a citizen of the United States, residing at Brooklyn, in the county of Kings, State of New York, have invented certain new and useful Improvements in the Liquefaction of Gases; and we do hereby declare the following to be a full, clear, and exact description of the invention, such as will enable others skilled in the art to which it appertains to make and use the same.

This invention relates to the liquefaction of gaseous mixtures and the separation of the constituents thereof, and particularly to certain improvements in apparatus whereby the operation is rendered more certain and the efficiency thereof is materially increased.

Our invention will be explained with reference to a well known type of liquefaction apparatus for which it is especially adapted, but it will be understood that the improvements may be embodied in other apparatus more or less resembling that described in which the same conditions are maintained. The apparatus referred to comprises a so-called "vaporizer" consisting of a plurality of tubes extending through a chamber adapted to contain a liquefied gas and terminating at their lower ends in a plurality of compartments or chambers in which liquid produced by the liquefaction of gas in the tubes accumulates. The upper ends of the tubes terminate in a common header so that the gas ascending in one set of tubes is caused to descend in the other set. The gas to be liquefied is delivered, under pressure and precooled to the desired temperature, to the outer compartment, and ascending through one set of tubes is subjected to selective liquefaction therein with "backward return" of the liquid in contact with the ascending gas. The gas is thus washed and enriched in the more volatile constituent while the liquid is enriched in the less volatile constituent, assuming that a binary mixture is treated. The enriched gas continues upwardly to the header and thence downwardly in the second set of tubes where it is liquefied and runs downwardly into the inner compartment.

Liquid produced externally of the system here described may and usually is delivered to the outer chamber. Both chambers are connected to a rectification column by suitable pipes with pressure-reducing valves therein. The liquids accumulated in the respective chambers, being of different composition, are delivered through the pipes to different levels of the column and descend therein in contact with gases and vapors rising therethrough. The consequent rectification results in a liquid consisting substantially of the less volatile constituent of the mixture which eventually descends to the "vaporizer" where it surrounds the tubes. The vaporization of this liquid under a lower pressure than that at which the gas is maintained in the tubes results in the liquefaction of the latter gas by the heat exchange effected. The more volatile constituent in a more or less pure condition escapes from the top of the rectification column.

The compartments heretofore mentioned in which the liquids accumulate as they descend in the tubes are formed in a pot below the "vaporizer" by an annular partition arranged therein. Owing to the wide range of temperature to which the parts are subjected, this partition has been supported heretofore on the bottom of the pot with its upper edge in loose engagement with the conical edge of a flange at the top of the pot. The partition is supposed to fit rather closely but with sufficient flexibility, owing to the conical surfaces on the flanges, to permit relative expansion and contraction of the parts.

In endeavoring to increase the efficiency of an apparatus such as that described, and particularly to increase the output and purity of the separated constituents of a gaseous mixture, we have discovered that the low efficiency of the apparatus has been due at least in part to leakage of gas between the inner and outer compartments of the pot.

To properly understand the results noted it should be observed that in the treatment of air, for example, to recover oxygen and nitrogen therefrom, the air is introduced into the outer compartment and in ascending the tubes is selectively liquefied, the liquid approaching a composition of about 47% oxygen which is the composition for phase equilibrium with gas of air composition. The nitrogen-enriched air passes into the other set of tubes, is liquefied there and descends into the inner compartment as relatively pure liquid nitrogen. The enriched oxygen liquid is delivered to the rectification column about midway of its height and the liquid nitrogen is delivered to the column at the top thereof. To ensure efficient rectification it is essential that the liquid nitrogen be as pure as possible. Now, if leaks develop between the outer and inner compartments, and leaks are unavoidable with the structure described, a portion of the air entering the outer compartment will find its way into the inner compartment without first passing upwardly through the tubes communicating directly with the outer compartment. The air will enter the tubes communicating with the inner compartment, and being liquefied therein, the liquid containing a considerable proportion of oxygen will contaminate the nitrogen liquid. The result is that rectification cannot be carried to the extent which is possible if a relatively pure nitrogen liquid is available.

It is the object of the present invention to prevent the leakage between the compartments of the pot and thus to increase the effectiveness of the operation in separating the constituents of gaseous mixtures.

Further objects and advantages of the invention will be apparent as it is better understood by reference to the following specification and accompanying drawing, in which Fig. 1 is a diagrammatic illustration of a column embodying the invention;

Fig. 2 is an enlarged vertical section through the pot and lower end of the vaporizer; and Fig. 3 is a transverse section on the line 3—3 of Fig. 2.

Leakage between the compartments can be avoided by the provision of a gas-tight partition and by the interposition of a "slip-joint" in the partition. The latter may expand and contract without presenting any opening or path for the gases about or through the partition. It will be observed that the pressures of the gases are substantially equalized on opposite sides of the partition so that no difficulty is experienced in making the joint and consequently the partition substantially gas-tight.

Referring to the drawing, 5 indicates a column having a receptacle or pot 6 at its bottom, a vaporizer 7 and a rectifier 8, this being the usual arrangement in commercial apparatus for liquefying and separating the constituents of gaseous mixtures. The vaporizer is provided with a plurality of sets of tubes 9 and 10 extending from a common header 11 to the receptacle 6 where they terminate in separate compartments as will be hereafter more fully explained. The rectifier includes a plurality of trays 12 over which liquid descends in contact with gases rising through the trays to accomplish the desired rectification of the liquid. The liquid is delivered to the rectifier through pipes 13 and 14 provided with pressure-reducing valves 15 and 16. The pipes 13 and 14 communicate with the compartments of the receptacle 6 and deliver liquid therefrom to the rectifier at different levels therein. The liquid descending in the rectifier is finally delivered by a pipe 12' to and accumulates in the "vaporizer" and the gaseous product from the "vaporizer" is delivered therefrom through a pipe 17. The gaseous effluent from the rectifier escapes therefrom through a pipe 18. The details of structure as hereinbefore described may be varied considerably in liquefaction apparatus of various kinds. The description herein is illustrative merely of the preferred type of apparatus.

The receptacle 6 at the bottom of the column is, as stated heretofore, divided into two compartments by a partition consisting of two annular sections 19 and 20, the upper and lower ends respectively of which are rigidly secured to flanges 21 and 22 projecting within the receptacle. Preferably, these sections are soldered in place so that no leakage of fluid through the joints is possible. In the preferred embodiment of the invention the lower section 22 is provided with spaced flanges 23 between which the lower edge of the upper section 19 is disposed. The space between the flanges 23 is filled with a suitable packing material 23', preferably red lead, which forms a fluid-tight seal, but which nevertheless permits relative movement of the sections resulting from expansion and contraction thereof.

It will be understood that the compressed and cooled gas is delivered to the outer compartment 24 of the receptacle at the base of the column through an inlet 25. It passes downwardly through a perforated plate 26 and thence upwardly in the tubes 9. Liquefied gases produced externally may be introduced to the outer compartment through a pipe 26'. Owing to the provision of a gas-tight partition no gas is admitted to the inner chamber 27 and all must pass upwardly through the tubes 9 and thence downwardly through the tubes 10 in which it is liquefied to the inner compartment. Any residual unliquefied gas escapes through a tube 27 to an outlet pipe 28 controlled by a valve 29.

From the foregoing description it will be understood that we are able, through utilization of the gas-tight partition, to prevent contamination of the liquid in the inner compartment with the constituent of the mixture which should be separated and retained in the outer compartment. This permits delivery of a relatively pure liquid to the top of the rectifier and a consequent increase in the effectiveness of the rectification. Experience has shown that we can improve the quality and output of separated constituents to a marked extent by the application of our invention. Thus we are enabled to produce oxygen of a purity approximating 99.6 per cent and in volume equivalent to the capacity of an apparatus of given size, whereas oxygen of this purity could only be obtained heretofore by very materially reducing the output of the apparatus. In view of the increasing demand for substantially pure oxygen for industrial purposes, this improvement marks an important advance.

Various changes may be made in the form, proportions and arrangement of the parts without departing from the invention or sacrificing any of the advantages thereof.

We claim:—

1. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers and partition forming a common wall between the chambers whereby contamination of the liquid in the other chamber is avoided, said partition being capable of longitudinal expansion and contraction and maintaining nevertheless a gas tight seal.

2. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers, and a gas-tight partition forming a common wall between the chambers whereby contamination of the liquid in the other chamber is avoided, said partition consisting of two rigidly supported sections and means between the sections to permit relative movement thereof.

3. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers and a gas-tight partition forming a common wall between the chambers whereby contamination of the liquid in the other chamber is avoided, said partition consisting of two rigidly supported sections and a slip-joint between the sections to permit relative movement thereof.

4. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers and a gas-tight partition forming a common wall between the chambers whereby contamination of the liquid in the other chamber is avoided, said partition consisting of two rigidly supported sections and a packed slip-joint between the sections to permit relative movement thereof.

5. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers and a gas-tight partition forming a common wall between the chambers whereby contamination of the liquid in the other chamber is avoided, said partition consisting of two rigidly supported sections, and a slip-joint between the sections having a packing of red lead to permit relative movement thereof.

6. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers, and a gas-tight partition forming a common wall between the chambers whereby contamination of the liquid in the other chamber is avoided, said partition consisting of two rigidly supported sections and a slip-joint between the sections formed by spaced flanges on one of the sections embracing the edge of the other section and packing material disposed between the spaced flanges.

7. In an apparatus for liquefying gaseous mixtures, a vaporizer comprising two sets of tubes, a casing surrounding the tubes and adapted to contain a refrigerating liquid, a header connecting the upper ends of the tubes, a body below the vaporizer including two chambers communicating with the lower ends of the respective sets of tubes and adapted to receive the liquid formed therein, means for supplying the gaseous mixture to one of the chambers and a gas-tight partition forming a common wall between the chambers whereby contamination of the liquid in the other chamber is avoided, said partition consisting of two rigidly supported sections and a slip-joint between the sections formed by spaced flanges on one of the sections embracing the edge of the other section and a packing of red lead disposed between the spaced flanges.

8. In an apparatus for liquefying gases, a receptacle adapted to receive the liquefied gases and a partition dividing the receptacle into compartments consisting of two rigidly supported sections each terminating within the receptacle and gas-tight means between the ends of the sections to permit relative movement thereof.

9. In an apparatus for liquefying gases, a receptacle adapted to receive the liquefied gases and a partition dividing the receptacle into compartments consisting of two rigidly supported sections each terminating within the receptacle and gas-tight means between the ends of the sections to permit relative movement thereof, said means consisting of a packed slip-joint.

10. In an apparatus for liquefying gases, a receptacle adapted to receive the liquefied gases and a partition dividing the receptacle into compartments consisting of two rigidly supported sections each terminating within the receptacle and gas-tight means between the ends of the sections to permit relative movement thereof, said means consisting of a packed slip-joint formed by flanges on one of the sections embracing the other and packing material between the flanges.

In testimony whereof we affix our signatures.

CHARLES E. RECORDON.
JOHN W. HILLE.